United States Patent
Barziza

(10) Patent No.: US 11,947,026 B2
(45) Date of Patent: Apr. 2, 2024

(54) OFF AXIS GUIDER WITH ONE OR MORE MECHANICALLY CONTROLLED PRISMS FOR ASTRONOMICAL TELESCOPES, METHODS OF ASSEMBLY AND USE FOR TELESCOPES

(71) Applicant: Sam Barziza, Conroe, TX (US)

(72) Inventor: Sam Barziza, Conroe, TX (US)

( * ) Notice: Subject to any disclaimer, the term of this patent is extended or adjusted under 35 U.S.C. 154(b) by 481 days.

(21) Appl. No.: 17/130,031

(22) Filed: Dec. 22, 2020

(65) Prior Publication Data

US 2022/0196779 A1    Jun. 23, 2022

(51) Int. Cl.
| | |
|---|---|
| G01S 3/786 | (2006.01) |
| G02B 23/04 | (2006.01) |
| G02B 23/14 | (2006.01) |
| H04N 23/55 | (2023.01) |

(52) U.S. Cl.
CPC ............ G01S 3/7867 (2013.01); G02B 23/04 (2013.01); G02B 23/14 (2013.01); H04N 23/55 (2023.01)

(58) Field of Classification Search
CPC ........ G02B 23/04; G02B 23/14; G02B 23/16; G02B 27/62; G02B 7/005; G03B 17/48; H04N 23/55; H04N 23/57; G01S 3/7867
See application file for complete search history.

(56) References Cited

U.S. PATENT DOCUMENTS

| | | | |
|---|---|---|---|
| 2004/0150899 A1* | 8/2004 | Barziza .................. | G03B 17/48 |
| | | | 359/822 |
| 2006/0115250 A1* | 6/2006 | Nomura ............... | G02B 27/646 |
| | | | 348/E5.025 |
| 2014/0085717 A1* | 3/2014 | Baun ..................... | G02B 23/16 |
| | | | 359/429 |
| 2014/0267640 A1* | 9/2014 | Barziza .................. | H04N 23/51 |
| | | | 348/61 |
| 2022/0066719 A1* | 3/2022 | Volfson .................... | F41G 3/04 |

* cited by examiner

*Primary Examiner* — Zachary W Wilkes

(57) ABSTRACT

An Off Axis Guider specifically designed with internal mechanically controlled placement of one or more prisms which allow the user to select stars in the telescope's field of view without obscuring the primary cameras' image capturing ability.

11 Claims, 11 Drawing Sheets

DETAIL A
SCALE 1 : 2

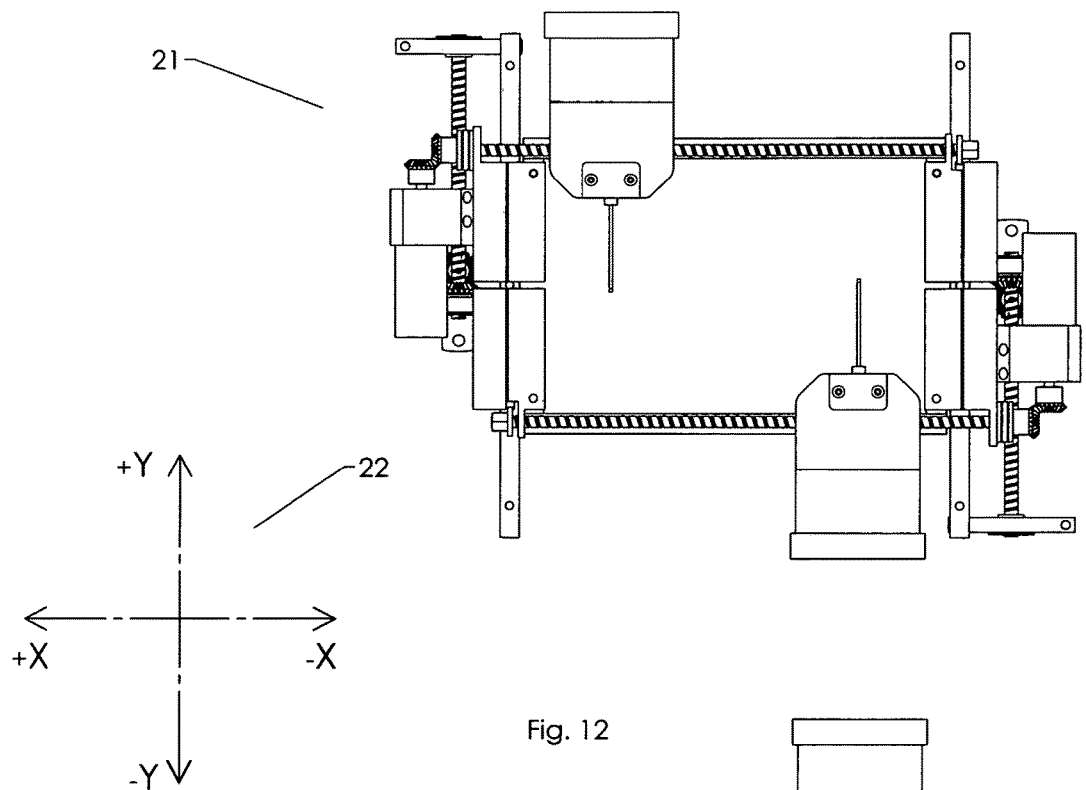
Fig. 11
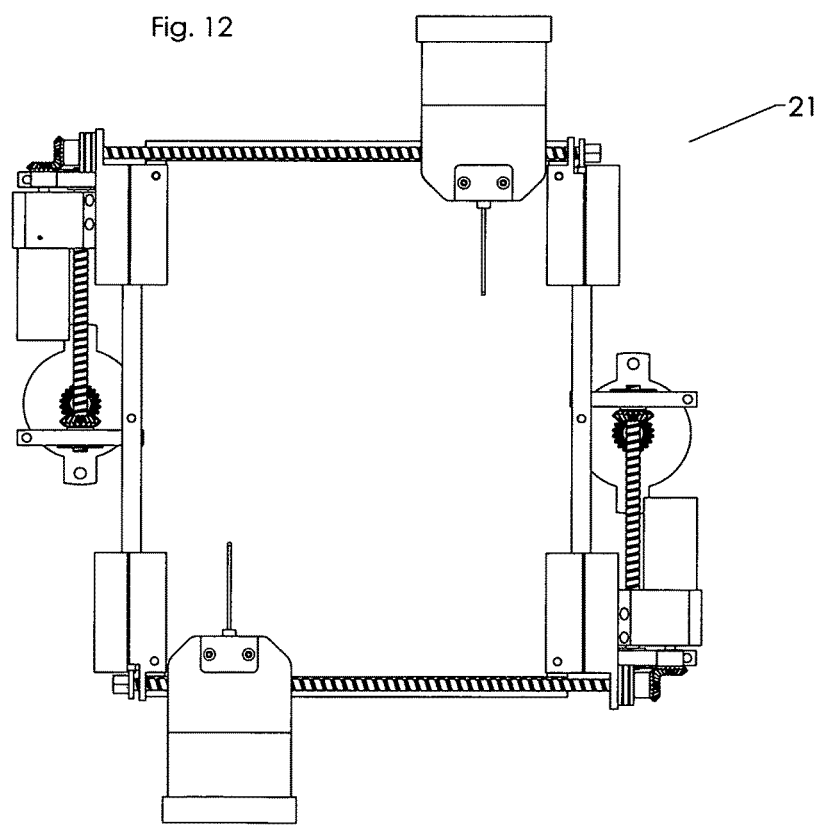
Fig. 12
Fig. 13

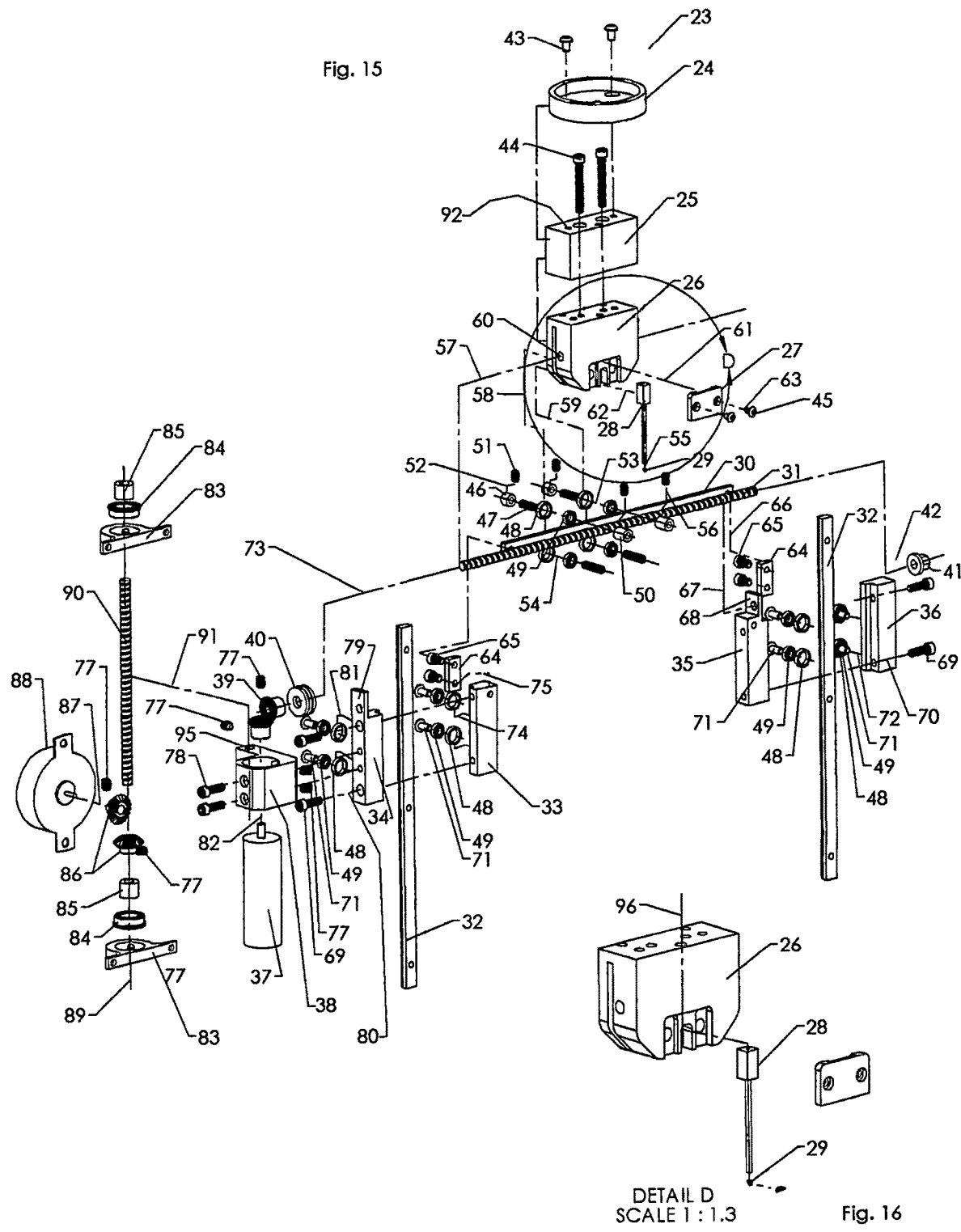

DETAIL A
SCALE 2 : 0.7

OFF AXIS GUIDER WITH ONE OR MORE MECHANICALLY CONTROLLED PRISMS FOR ASTRONOMICAL TELESCOPES, METHODS OF ASSEMBLY AND USE FOR TELESCOPES

BACKGROUND OF INVENTION

This is a nonprovisional application that is an accessory that is used on a telescope. Specifically astronomical telescopes that, are commercially available. Professional observatories will benefit from this invention as well. The present invention relates to a new and non-obvious accessory that is used for acquiring stars in an adjacent area near the image forming plane area of an optical astronomical telescope. The purpose for acquiring such stars is to allow the telescope to keep the desired object under investigation, in perfect alignment and allow a stable field of view with respect to the Earth's rotation, and or misalignment of telescope's internal optical system, (an example of this is that with some commercial Schmidt Cassegrain telescopes the primary mirror will move or slip ever so gradually over time and that will ruin any images one acquires), or telescope mount or less than perfect camera to telescope attachment. Furthermore it is essential for all aspects of astronomical investigations where a prolonged period of investigation by means other than visual inspection is employed that a method of keeping the telescope pointed and fixed on the desired object is used and this is called tracking. Therefore in order for the telescope to track, a star is needed. However a distinction is needed to differentiate the meaning of a telescope mount which is motorized and can compensate for the Earth's rotation, and guide star tracking. A stand alone motorized telescope mount does not have the ability to perform at the level required for perfect, non smeared, pin point stars, image capture. Therefore a system has to be used whereby a second camera can be used to watch at very fast intervals any change in position of a selected star and calculate the required telescope mount corrections to keep the selected star centered on the secondary camera. Thus enabling the main imaging camera to take a long exposure of the desired object. This secondary camera is normally called a tracking camera, or auto-guiding camera. The job of the secondary camera is normally referred to as tracking or auto-guiding.

The area in and around the optical axis of the telescope for acquiring tracking stars can be selected by placement of the so-called pick off prism in the area of the optical output of the telescope. The prism can be mechanically moved bi-directionally across the optical field of view. While there are other off axis guiders in the market place and some have been around for a long time they leave much to be desired. The currently available off axis guiders in the market place are awkward, hard to use and all are manually operated, one must pull or push, and clamp by hand any and all moving elements, and this wrecks havoc on the position of the object in the camera's imaging area. All of this jostling and twisting the parts of the off axis guider, one can lose the desired object entirely, or lose focus, all of which are time consuming to correct. The prism or mirror is large and can obstruct a lot of light. It can cast a shadow on the image plane, and can barely be adjusted in place, in other words very limited in movement for the prism. And still finding a suitable star for guiding is very hard, and time consuming. Basically one size fits all, very little variability in make and models.

SUMMARY OF INVENTION

This off axis guider assembly is a dedicated, purposely designed accessory, in that the sole purpose is to find stars off the optical axis of the telescope's field of view. Also it is designed to be light weight and thin. This off axis guider is unique in that it can be designed around specific mechanical components. It is not limited to just bearings, wheels or rollers or lead screws; or even motors and gears. For example an all sliding device can be made without bearings or wheels or even motors. A wide range of choices and strategies are available to the designer which with technological advances such as linear motors, piezo electric motors, ceramic motors, or future motion controlled technological advances hereto undreamt of, offer incredible possibilities for the future. This off axis guider described below is one design path or strategy only, merely an example of a specific design based on a concept. The concept is not constrained or limited by a specific design, but the design can take broad paths to produce a version of the concept. A specific design is detailed below of the Astronomical dual port full 360 off axis guider in which this off axis guider accessory is an assembly that is connected to a telescope by an adapter. And another adapter connects the camera to the off axis guider accessory at the opposite end of the off axis guider accessory. The off axis guider accessory has internal assemblies that is composed of either 1 or 2 independently controlled, bi-directional [bi-directional meaning the optical X and Y axis of the image plane of the telescope in the Cartesian optical coordinate system where the Z axis is the path of light thru the telescope] access ports which will allow a specific or auxiliary camera to view a small right angle prism. In so doing the specific camera [hereto called an auto guiding camera] can view a small portion of the light that is coming thru the telescope, and move across the field of view, (the Field of View or FOV being the image plane of the telescope) without the need of the main imaging camera, to be moved, rotated, or focused. Furthermore the telescope can remain fixed on target while the auto guiding camera is moving across the field of view. A one access port version of this off axis guider may be advantageous in certain circumstances where weight, limited adjacent space, or overall size plays a part in the selection of an off axis guider. The auto guiding camera is attached by a simple round connector [a barrel or tube commonly available aftermarket item] which in turn is inserted into a commonly available aftermarket focusing device commonly known as a helical focuser. In which the helical focuser is attached to one of the access ports of the invention. The access port is composed of pieces that include a prism assembly stem, a roller body block, extension block, threaded helical focuser adapter plate. The access port assembly has wheels that move along a grooved rail, in which the access port assembly can transverse along the grooved rail in a plus or minus direction. For the sake of simplicity this direction of motion shall be called the X direction. The access port assembly can move along the grooved rail in a +X or −X direction. The grooved rail which the access port assembly traverses along is attached to a wheel block assembly. This wheel block assembly has wheels that move on a second grooved rail which is perpendicular to the X direction grooved rail. This second direction is the Y direction. The second grooved rail which is the Y direction rail is fixed and does not move. With the X and Y directional movement of one guide star access port the right angle prism can access 180 degrees of motion. With 2 identical access ports opposite one another a full range of 360 degrees is achieved without interfering with the main imaging camera. Furthermore a motor and a gearing system is employed on both the X1, Y1 and X2, Y2 directions. Thus with 2 auto guiding cameras any star can be used for auto guiding the telescope, without interfering with the main imaging camera. Astronomical stellar objects can be studied or imaged with the main camera without the need of concern of the placement of the auto guiding camera. Mechanically this device lends itself well to a range of automation, such as computer control, automated observational orchestration control, remote autonomous operations to name a few. The dual guide star access ports with their roller block housing attached to grooved rails and motor and gear configurations are mounted in the main support base. This support base is where everything is place and assembled. A cover is attached to the main support base.

This invention is constructed from machined parts of aluminum, and with off the shelf bearings, thrust bearings, and various screws and or fasteners.

BRIEF DESCRIPTION OF DRAWINGS

Page 1

Page 2

Page 3

Page 4

Page 5 FIG. 11 and FIG. 12 are drawings that show the range of motion for both ports.

FIG. 13 is a reference drawing of the X and Y directions.

Page 6

Page 7 FIG. 15 is an exploded perspective view of FIG. 14.

FIG. 16 is a detail view of a portion of FIG. 15.

Page 8

Page 9

Page 10

Figures 21, 22:
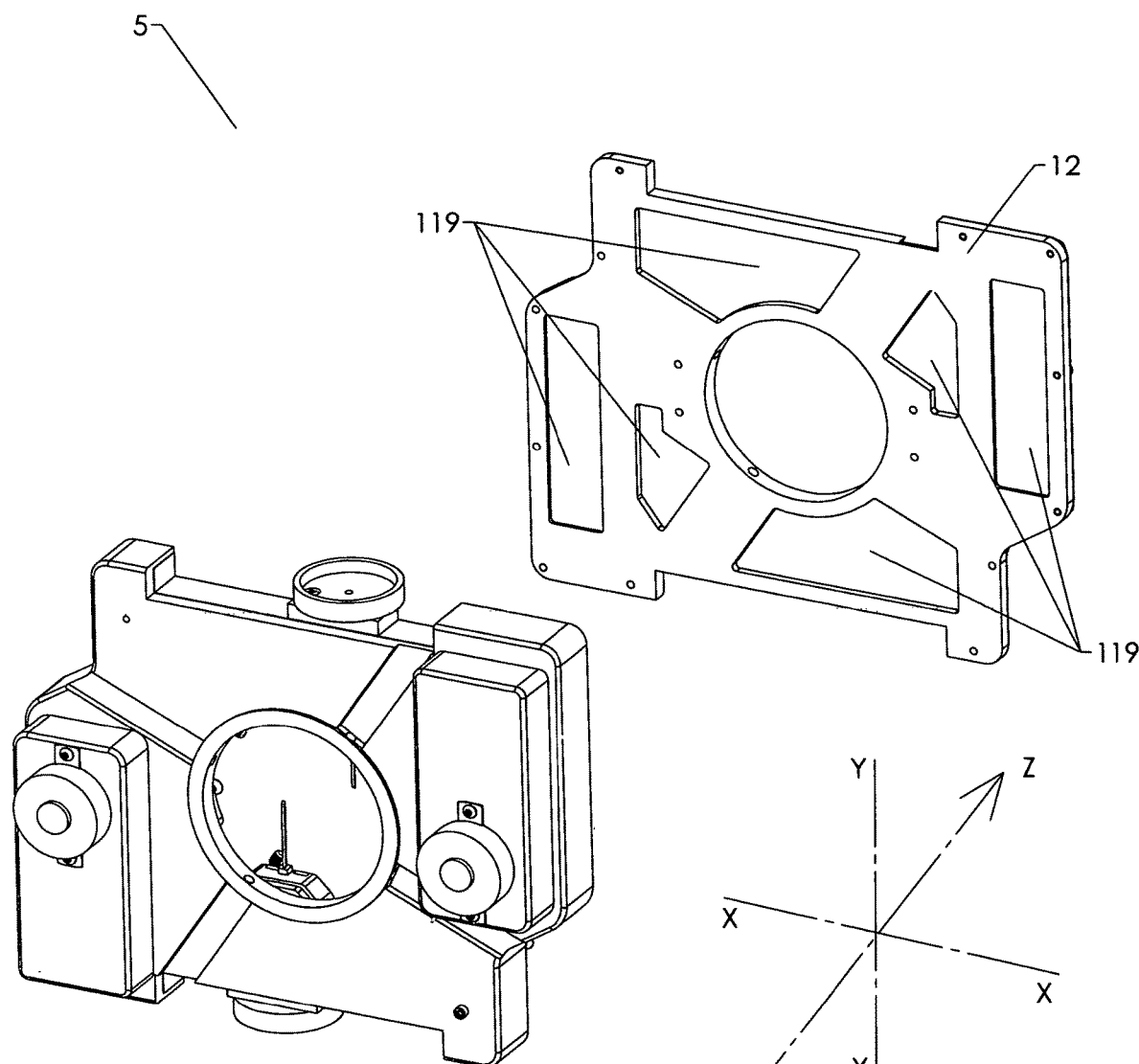

Page 11 FIG. 21 An exploded view of the invention showing the light weighting features of the cover.

FIG. 22 is a simple optical axis schematic of a telescope. The Z line is the optical axis. The X and Y lines are the directions or planes of the telescope's optical field of view.

DETAILED DESCRIPTIONS OF DRAWINGS

Figure 1:
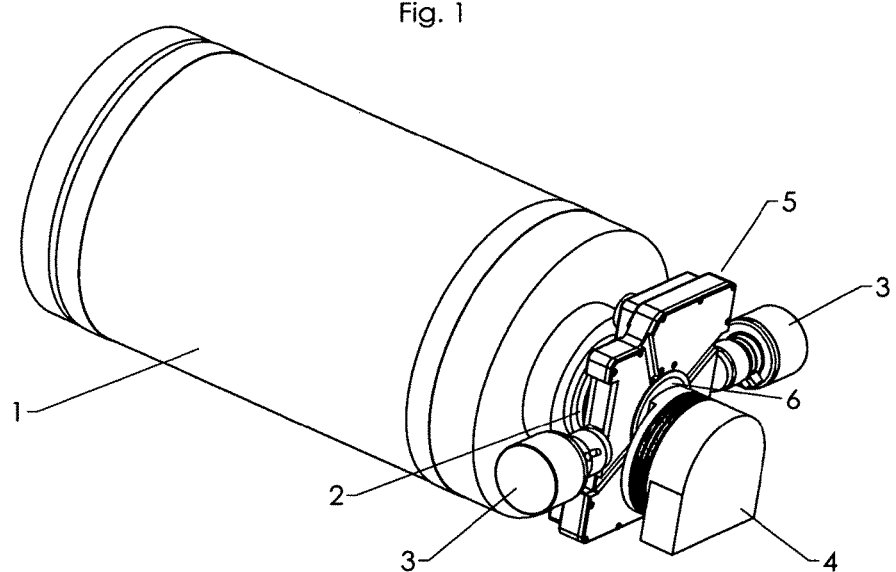
FIG. 1 is a perspective view which has a telescope the off axis guider assembly the main imaging camera and two auto guiding cameras.

Page 1, FIG. 1 A perspective view of the invention, is a typical mounting arrangement with the components that form the imaging train and guiding train. The telescope Item 1 is attached to the invention by a simple common off the shelf adapter Item 2. Item 5 is the invention which is attached to the main imaging camera item 4 by another common off the shelf adapter Item 6. Item 3 are the auto guiding cameras attached to Item 5.

Figure 2:
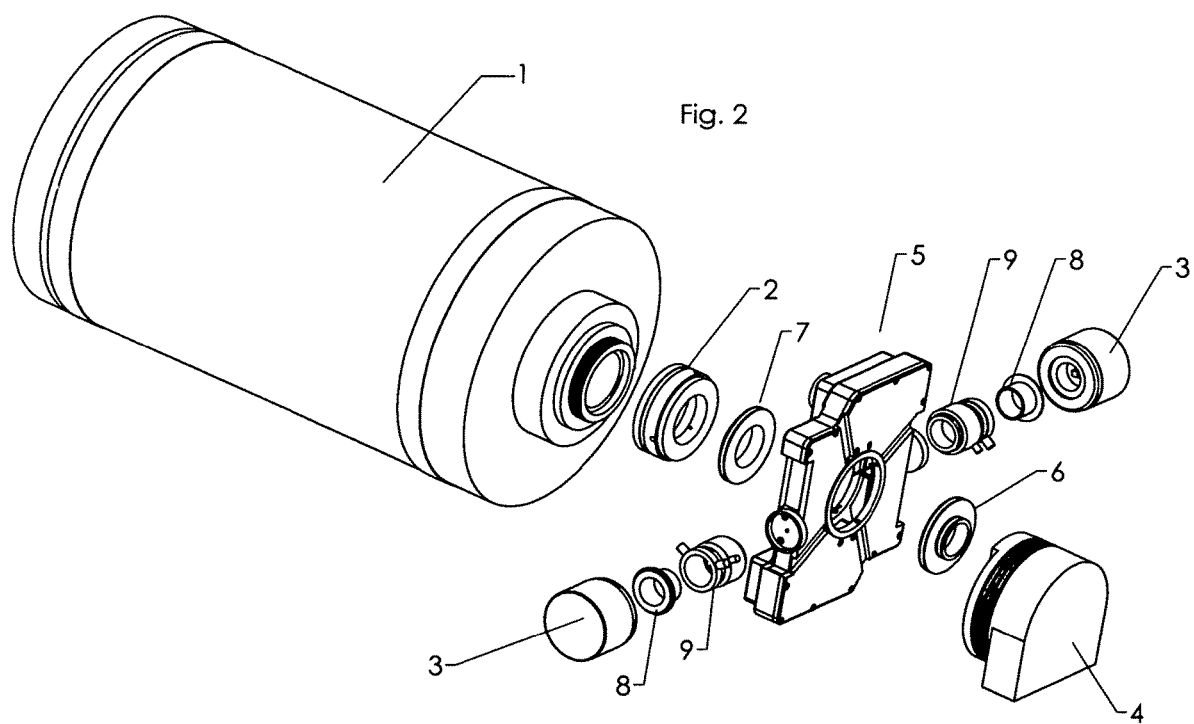
FIG. 2 is an exploded perspective view of the above assembly.

Page 1 FIG. 2 Is an exploded perspective view of FIG. 1 showing the telescope Item 1 connected to a common adapter Item 2 which in turn is connected to another common adapter Item 7 and that is attached to the invention Item 5. From Item 5 a adapter Item 6 connects a camera Item 4 to the invention Item 5.

On both ports of the invention are auto guiding cameras Item 3 that use common off the shelf adapters Item 8, and are inserted into a common off the shelf helical focuser Item 9 which is connected to the invention Item 5.

Figure 3:
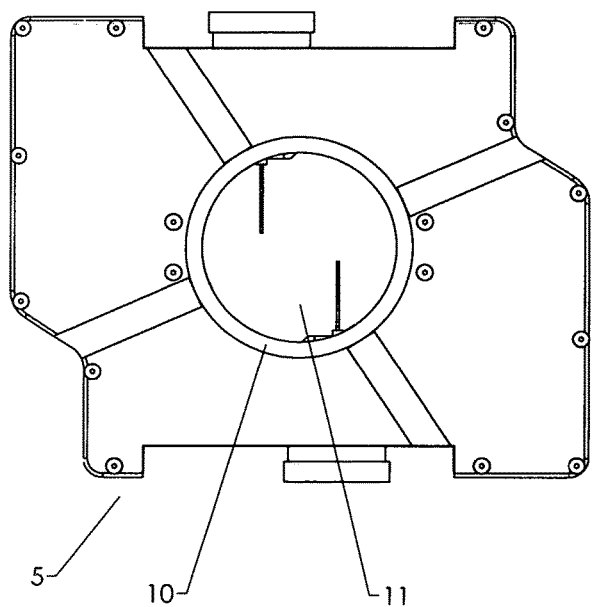
FIG. 3 is a view of the camera attachment side of the invention.

Page 2 FIG. 3 Is a view of the invention Item 5 from the camera mounting side. The large thru hole is Item 11. Item 10 is a raised edge that adapters can be placed for attaching to a camera.

Figure 4:
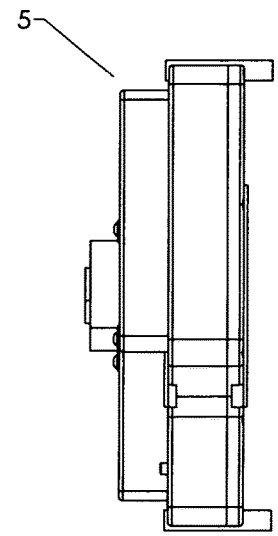
FIG. 4 is a side view of the invention.

FIG. 4 is a side profile view of Item 5

Figure 5:
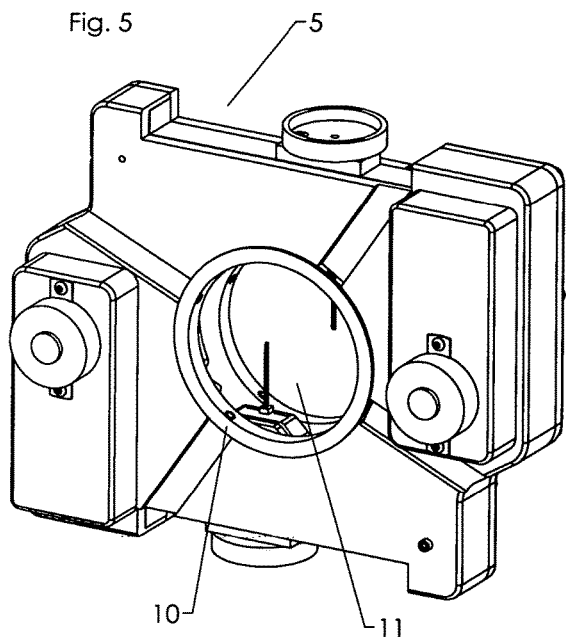
FIG. 5 is a perspective view of the telescope attachment side of the invention.

FIG. 5 is a perspective view of Item 5 showing the telescope mounting side. The large thru is Item 11 with the mounting edge is Item 10.

Figure 6:
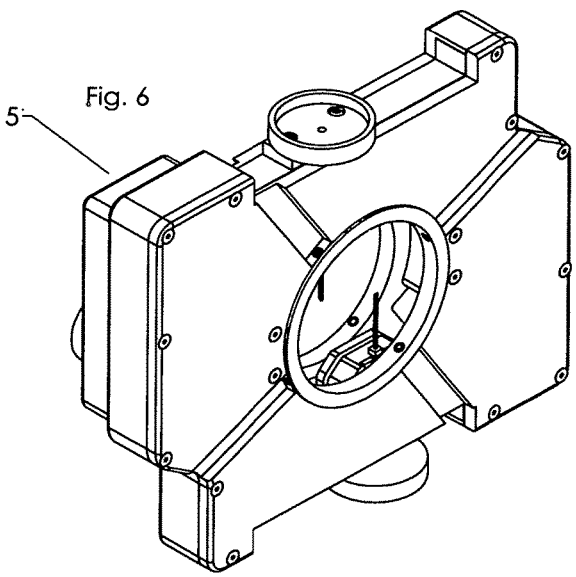
FIG. 6 is a perspective view of the camera attachment side of the invention.

FIG. 6 is a perspective view of Item 5 showing the camera mounting side.

Figure 7:
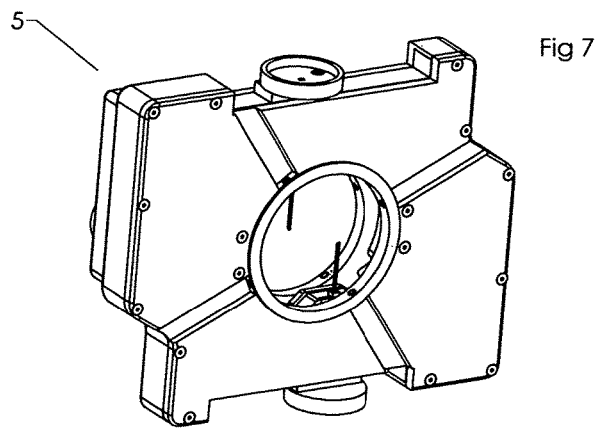
FIG. 7 is a perspective view of the camera attachment side of the invention.
Figure 8:
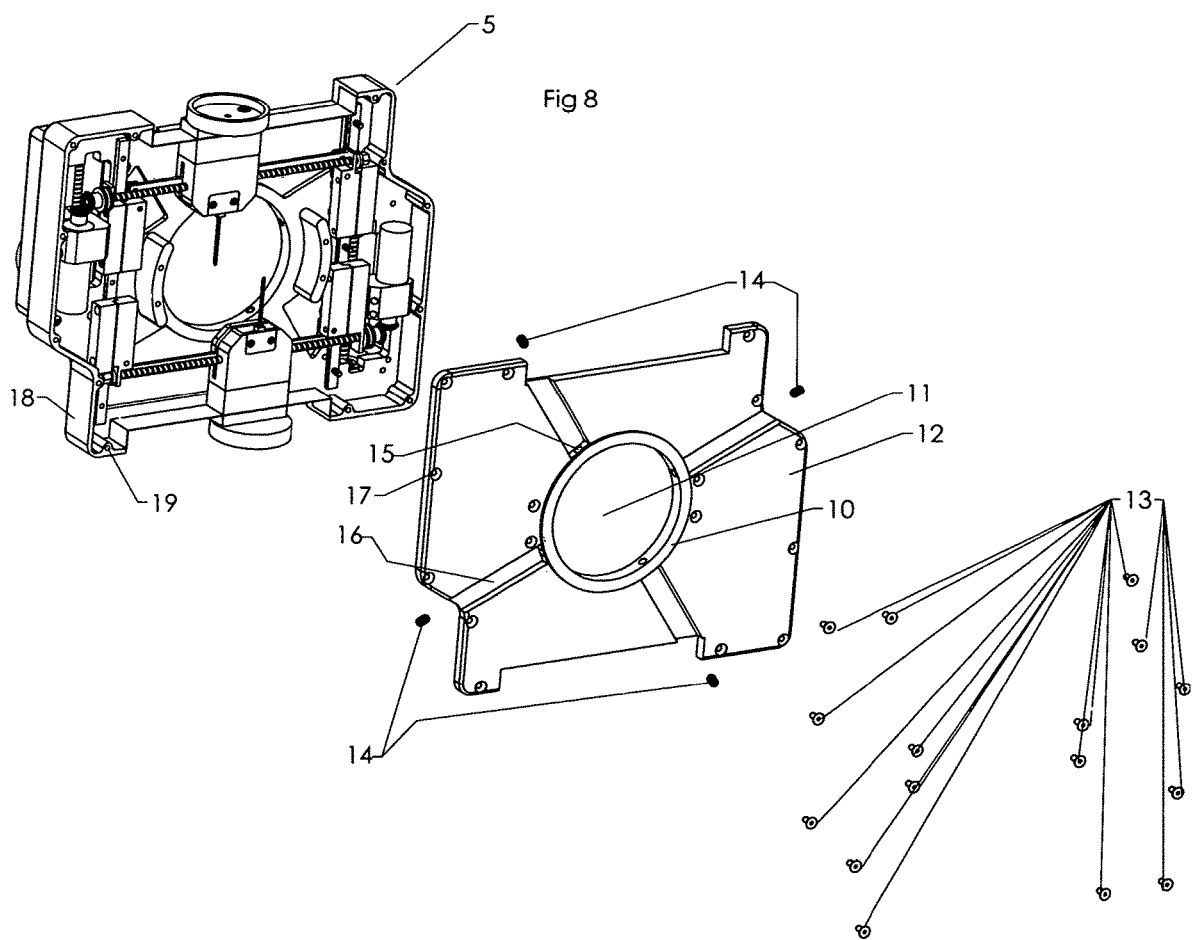
FIG. 8 is an exploded perspective view of the invention showing the interior.

Page 3 FIG. 7 is a perspective view of Item 5 showing the camera mounting side. FIG. 8 is an exploded perspective view of the invention which is Item 5. Item 12 is the cover which has a large thru hole Item 11 with a round mounting boss Item 10.

Item 13 are counter sink machine screws that are used to affix Item 12 onto the base which is Item 18. Item 19 are threaded holes in the base (Item 18) which Item 13 are threaded. Counter sink holes Item 17 are on the cover (Item 12).

Item 14 are socket set screws that thread into hole Item 15 of the cover Item 12. Item 14 (set screws) act as clamps for attaching mounting adapters to connect to telescopes and cameras. Clearance channels Item 16 allow hex keys or ball drive tools to access the set screw. Item 16 also has a light weighting effect on the invention.

Figure 9:
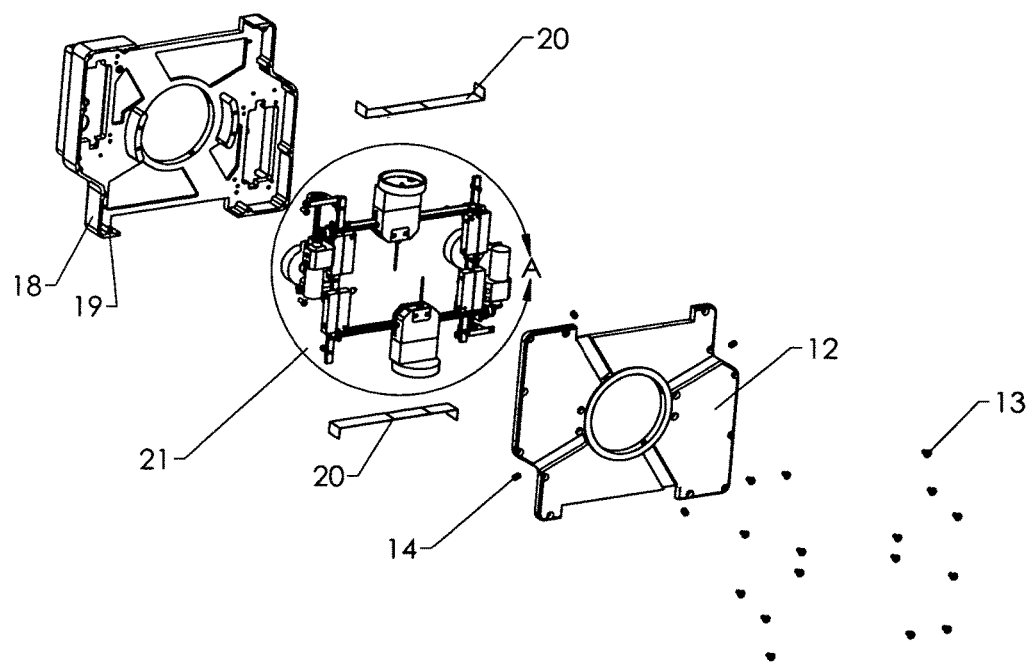
FIG. 9 is a exploded perspective view of the invention with the invention's base and invention's cover separated revealing the interior components.

Page 4 FIG. 9 is an exploded perspective view of Item 5 of the camera mounting side, showing the interior assembly Item 21. Item 20 are thin pieces of rubber sheets cut as rectangles that act as a light shield, that is to prevent stray light from entering. Item 12 is the cover, Item 14 are the set screws, and item 13 are the mounting screws for the cover.

Figure 10:
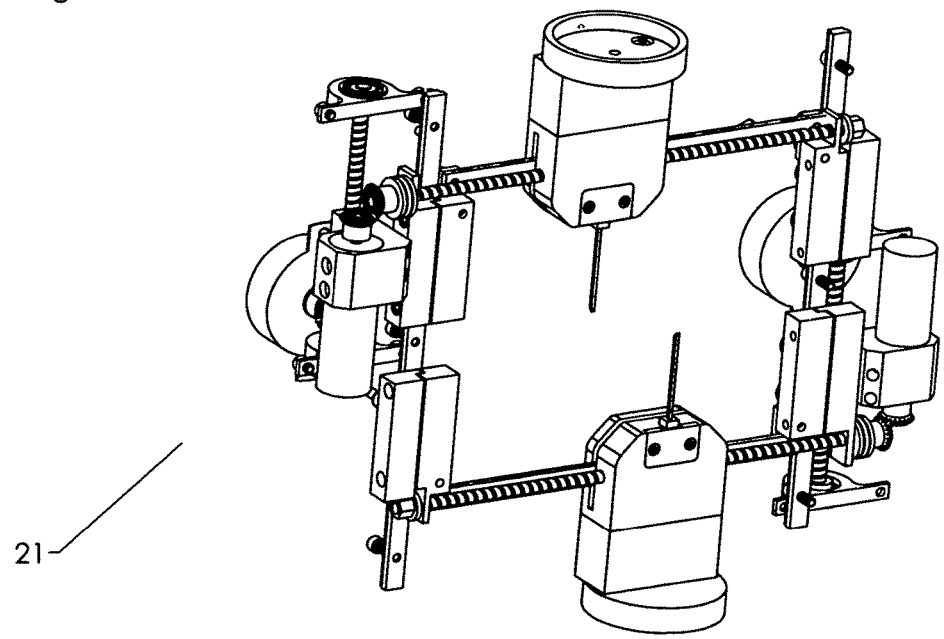
FIG. 10 is a Detail view of FIG. 9 which shows the interior components.

FIG. 10 Is a detailed view of FIG. 9 which shows the assembly Item 21.

Page 5 is a view of the interior of invention which shows two main Figures (Item 21 in both figures), and a third one. The two main figures, FIG. 11 and FIG. 12 represent the range of travel the two guiding access ports have. Which in other terms means the range that the prism(s) can travel across the field of view that a telescope would produce. FIG. 13 is a simple two axis schematic showing the directions of travel.

Figure 14:
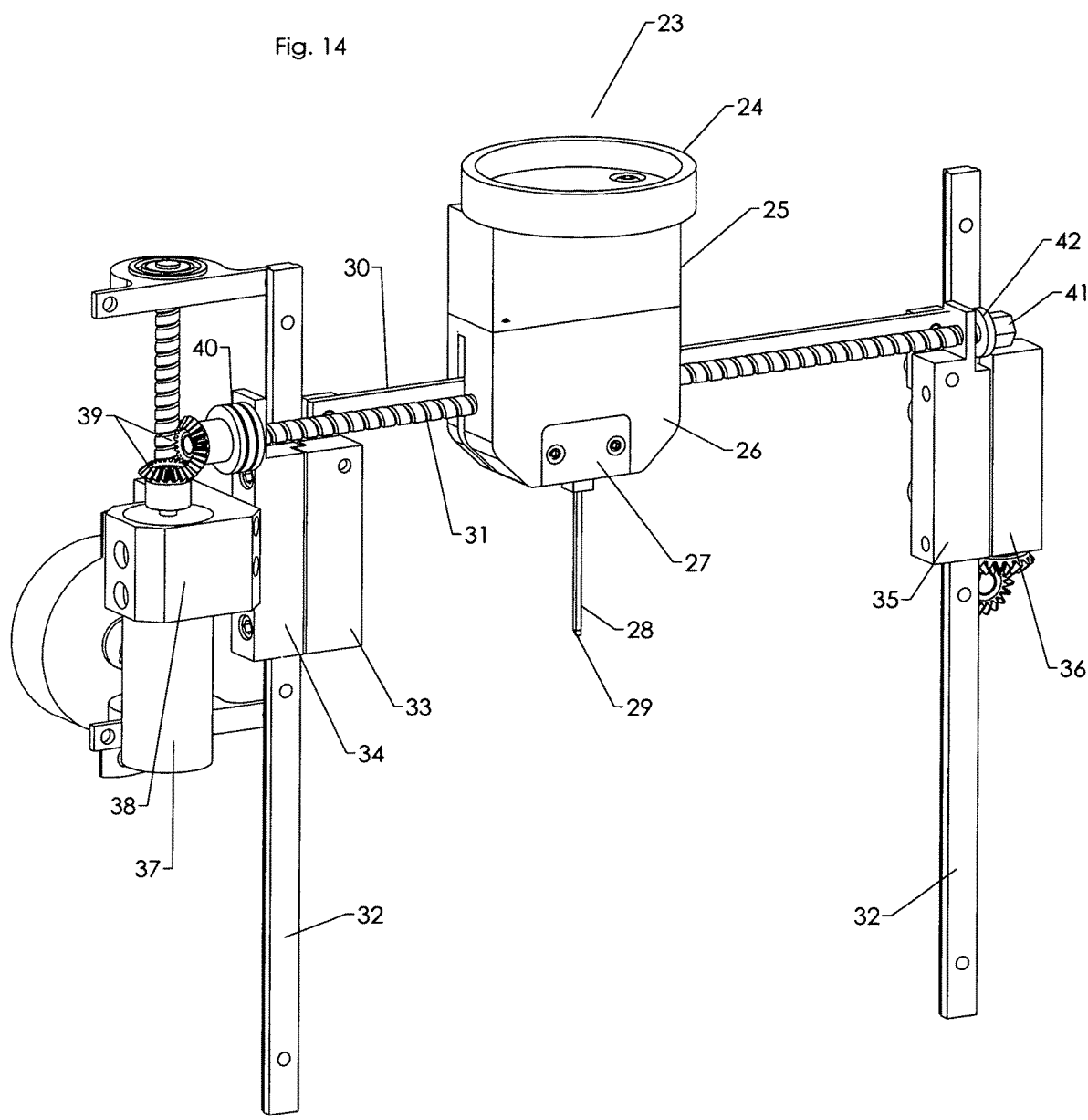
FIG. 14 is a perspective view of one port and the components that comprise it.

Page 6 FIG. 14. This is a perspective view of one access guiding port Item 23 which is a sub assembly that is inside the invention. This perspective view of FIG. 14 only shows this sub assembly. The rest of the parts of the invention are not shown so that a clearer view may be presented.

A brief description of some of the parts. More detailed information of all parts will follow on the next pages.

Item 24 is a receptacle for which to attach a camera for the purpose of guiding the telescope. Item 25 is a connecting piece that allows Item 24 to reach and connect to Item 26. Item 26 is a part that has curved rollers that are mounted inside Item 26.

Item 26 will move across the bar Item 30. Movement is achieved by means of a threaded rod Item 31 that is fixed but yet turns.

Attached to Item 26 is Item 27 which is a mini cover for the prism stem. The prism stem (Item 28) is mounted under the cover (Item 27). The prism stem is designed to be replaceable with other sizes of prism or even beam splitters. The prism (Item 29) is glued to the end of Item 28. There are 2 grooved rails Item 32 that are mounted to the main base of the invention. Items 35 and 36 are a support carriage that travels along grooved rail Item 32. Items 33 and 34 are parts of the primary carriage which also travels along another grooved rail Item 32. The comprised assemblies of the support carriage (Item 35, 36) and the primary carriage (Item 33, 34) have rounded wheels that are in contact with the grooved rail. These wheels are located on the side opposite from the view in FIG. 14. These rounded wheels will be shown in the following FIGS. 15, 16, 17. Attached to the primary carriage is a motor brace, Item 38. Inserted and clamped by means of (set screws) in the motor brace is the motor Item 37. Attached to the motor is one gear of gear assembly Item 39. The mating gear (second gear) of this gear assembly is at a right angle and is attached to the threaded rod Item 31. The gear that is clamped onto the threaded rod is placed next to a thrust bearing Item 40. The thrust bearing is placed between the gear and flange of Item 34. At the opposite end of the threaded rod, is one more thrust bearing Item 42. Item 42 is positioned and in contact with a flange of Item 35.

Placed next to Item 42 is Item 41, a custom made threaded Nut, that is attached to the threaded rod (Item 31).

Page 7 FIG. 15 is an exploded perspective view of the internal bi directional motion of one guiding access port of the invention. This sub assembly is Item 23. Item 43 are machine screws that go thru Item 24 to attach to Item 25, in threaded holes Item 92. Item 44 are screws that go thru Item 25 to attach to Item 26. Item 29 is a right angle prism that is glued onto Item 28, (Routing line Item 55). Item 28 sits inside a pocket of Item 26. Routing line (Item 62) shows the location of pocket. A cover Item 27 is attached by screws Item 45 onto Item 26. Routing line Item 63 shows the location of screw holes while routing line 61 shows the location of cover (Item 27) onto Item 26. Item 27 will act like a locking clamp onto the prism stem (Item 28) when attached. This will allow the prism stem (Item 28) to be replaceable for larger prisms as an example. Item 31 is a threaded rod that is the mechanism of motion that acts upon Item 26. Since Item 31 is fixed but can rotate in the matching threaded hole Item 60 (Routing line Item 57) of Item 26, this rotational motion with push or pull Item 26. Item 48 is a wheel that has a beveled or radius edge. Inside Item 48 is the bearing Item 49. Item 47 is a set screw that goes thru the bearing. Item 46 is a simple bushing. The set screw (Item 47) also goes thru this piece. Item 30 is a rectangular part that is a guide for Item 26 to travel. Item 30 has, on the long edges a curved slot that Item 48 fits into. This concave feature runs along the length of Item 30 on both sides.

With this arrangement of the wheel (item 48) fitting into the inside concave groove that is in the rail (Item 30) the wheel (Item 48) is securely held in place. Tension is applied to the bearing, wheel, and sleeve, (Items 49, 48, 46 respectively) by a set screw Item 51 which routing line 52 shows where Item 51 is applied onto Item 46. Tension on the opposite end is applied to the bearing, wheel, and sleeve, (Items 49, 48, 50 respectively) by a set screw Item 51 which routing line 56 shows where Item 51 is applied onto Item 50. Routing line Item 54 shows only a wheel, bearing, and a set screw. (Items 48, 49,47 respectfully) which is in contact with the concave edge of Item 30. No tension is applied to this side.

Routing Line Item 58, shows where Items 46, 47, 48, 49, and 50 (respectfully) are placed in Item 26, this is the tension side. Routing line 59 show where Items 47,48, 49 (respectfully) are placed in Item 26. This is the non tension side.

Item 92 show where Item 51 (set screws to act as tension screws), goes into Item 26. Routing line 66 shows where Item 64 is connected to Item 30 and Item 35. Item 64 is a small plate that affixes to Item 30 and Item 35 with screws Item 65. Routing line 70 show screws Item 69 go thru Item 36 and attach or bolt into Item 35. Item 32 is a rectangular plate very similar to Item 30 with variations. Item 32 is thicker and is slightly "T" shaped. Item 32 has the same concave edges as does Item 30. The same radius shaped wheels Item 48 (as described above) are used with the T-shaped concave edged rail Item 32. Screw (Item 71) and bearing (Item 49) are inserted into Item 48. This is bolted onto Item 35 and Item 36. Tension or pressure can be applied to the wheel bearing that is exerted onto the T-shaped concave edged rail Item 32. The screws (Item 69) that pass thru Item 36 are threaded into Item 35. Items 35 and 36 are not exactly matched fitting parts. The side edges are shorted so as to allow Items 35 and 36 to act as a clamp on the rail Item 32. The wheels Item 43 are the parts that are in contact with the rail Item 32. Item 68 is a tab or boss that extends from Item 35. Routing line 67 shows that the threaded rod (Item 31) passes thru this tab thru a clearance hole, and thru a small thrust bearing Item 42 and thru a custom nut with flange Item 41. Routing line 66 shows where Item 64 is connected to Item 30 and Item 35. Item 64 is a small plate that affixes to Item 30 and Item 35 with screws Item 65.

Routing line 80 show screws Item 69 go thru Item 34 and attach or bolt into Item 33. Item 32 is a rectangular plate very similar to Item 30 with variations. Item 32 is thicker and is slightly "T" shaped. Item 32 has the same concave edges as does Item 30. The same radius shaped wheels Item 48 (as described above) are used with the T-shaped concave edged rail Item 32. Screw (Item 71) and bearing (Item 49) are inserted into Item 48. This is bolted onto Item 34 and Item 33. Tension or pressure can be applied to the wheel bearing that is exerted onto the T-shaped concave edged rail Item 32. The screws (Item 69) that pass thru Item 34 are threaded into Item 33. Items 34 and 33 are not exactly matched fitting parts. The side edges are shorted so as to allow Items 34 and 33 to act as a clamp on the rail Item 32. The wheels Item 48 are the parts that are in contact with the rail Item 32. Item 79 is a tab or boss that extends from Item 34. Routing line 73 shows that the threaded rod (Item 31) passes thru this tab thru a clearance hole, and thru a thrust bearing Item 40 and thru one miter gear Item 39. Item 38 is a motor bracket that Item 37 (gear head motor) fits into. Item 78 (bolts) attach Item 38 to Item 34. Item 77 are set screws that are used in Item 38 to work as clamps to hold Item 37. At the shaft of the gear head motor (Item 37) a miter gear (from the miter gear set Item 39) is attached. Routing line (Item 82) shows where the miter gear is placed. Item 77 will thread into one gear from the gear set Item 39 to clamp onto shaft of motor Item 37. Item 77 will thread into one gear from the gear set Item 39 to clamp onto threaded rod Item 31. Item 77 will thread into one gear from the gear set Item 86 to clamp onto shaft of the motor Item 88. Item 77 will thread into one gear from the gear set Item 86 to clamp onto the threaded rod Item 90.

Item 95 is a threaded hole in the motor bracket (Item 38). Routing line Item 91 show the threaded rod (Item 90) is placed in this threaded hole. As Item 90 turns the motor bracket (Item 38) will move along the threaded rod. Routing line Item 89 shows the order of placement of the following items that hold the threaded rod Item 90 and its connection to a motor Item 88. Bearing holder Item 83 houses the flanged bearing Item 84 with Item 85 (a threaded nut) inside the bearing. A gear from the miter gear set 86 is threaded to fit the thread rod Item 90. Item 90 is inserted or threaded into the nut Item 85 which rest in the bearing. The matching gear (Item 86) from the miter gear set is attached to the motor Item 88. And at the other end of the thread rod (Item 90) a duplicate arrangement of parts (Item 83, 84, 85) is used to secure the thread rod. FIG. 16 is a detailed view of FIG. 15. FIG. 16 shows the light path (routing line Item 96) thru the prism (Item 29) then thru the prism stem piece (Item 28) and thru the prism carriage block (Item 26) and onto the secondary camera.

Figure 17:
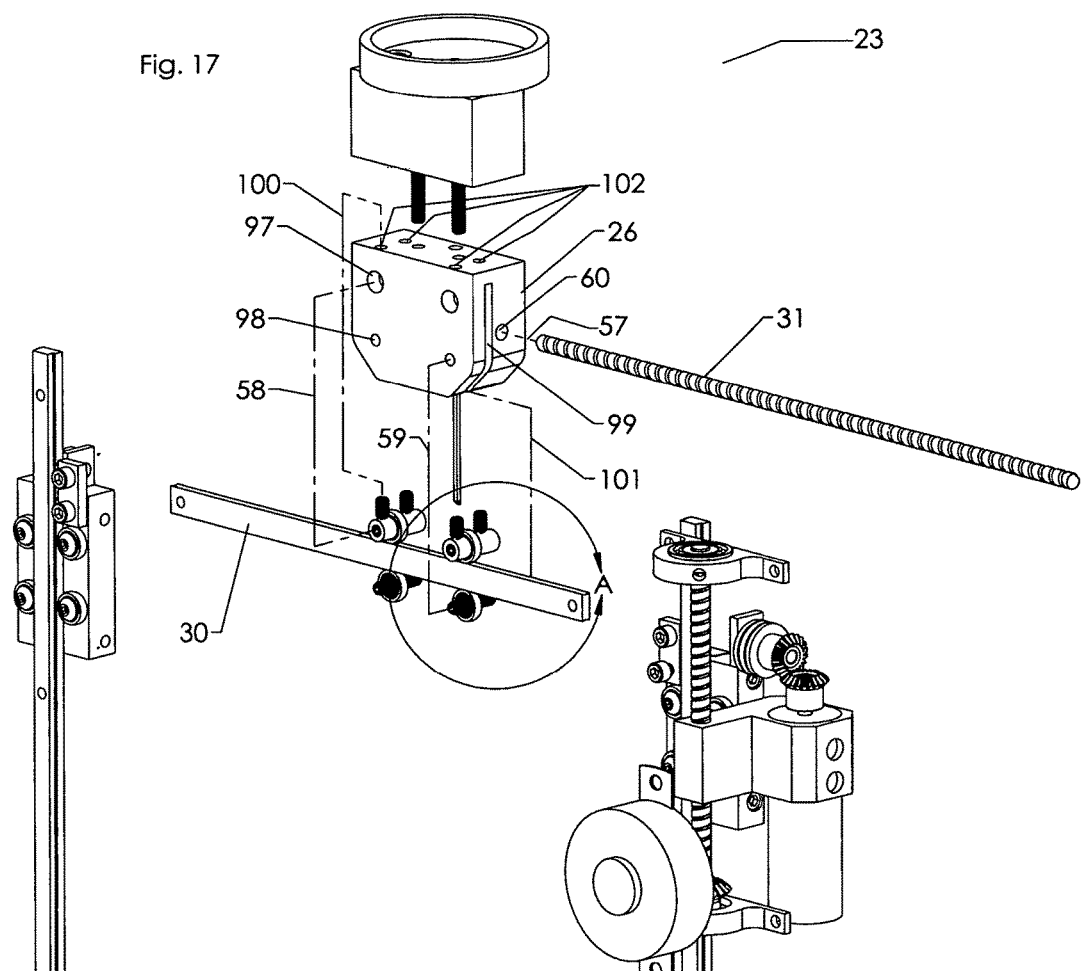
FIG. 17 is a partial exploded perspective view of the opposite side of FIG. 15.

Page 8, FIG. 17 is a partially exploded perspective view of Item 23. Routing line Item 57 shows the thread rod Item 31 inserts into hole Item 60 of Item 26. Routing line of drawing Item 58 shows hole Item 97 where Items, 47,48,49, 46 and 50 are placed inside the hole Item 97 of Item 26. Routing line Item 100 shows holes 102 where Item 51 set screws are placed. The set screws Item 51 in holes Item 102 only purpose is to apply pressure upon Item 46 and Item 50 which are simple bushings. The longer set screw Item 47 is inserted into the bearing (Item 49). The bearing in turn is inserted into the convex edged shaped wheel (Item 48).

It is important to have the ability to apply pressure in this manner, which greatly aids in the assembly of invention.

Item 59 is a drawing routing line showing the holes Item 98 of Item 26 where Item 47 which are common off the shelf set screws are placed to hold Items 49, 48 in place inside the slot Item 99 of Item 26. Item 99 is a slot where the concave edged shaped rail Item 30 is placed.

Figure 18:
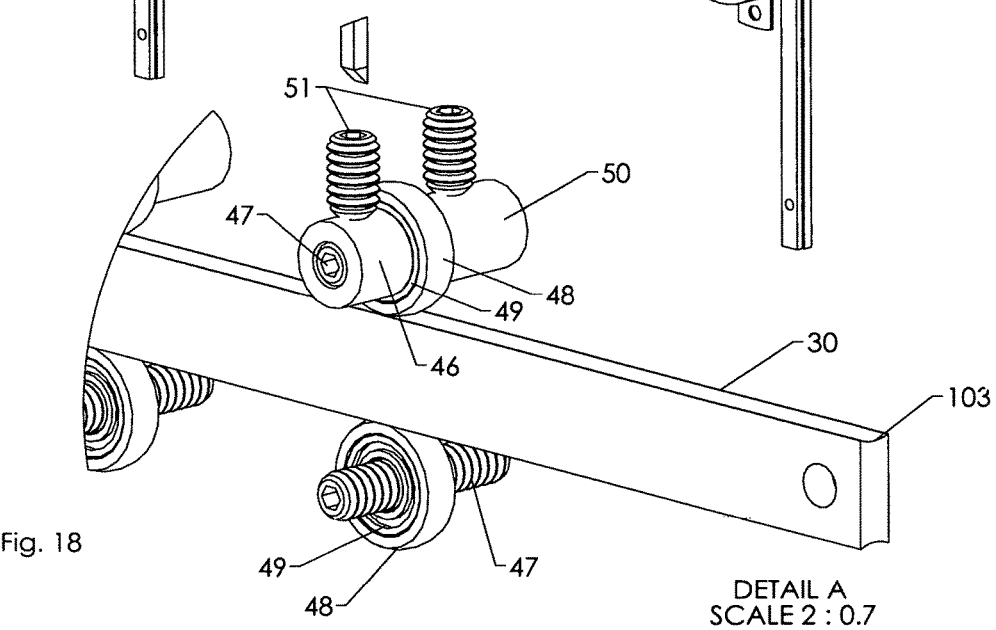
FIG. 18 is a detail view of FIG. 17.

FIG. 18 is a detail view of FIG. 17. In their proper orientation and placement in the invention but in a slight exploded view, are the Items, 51 (set screws that apply pressure) Item 47 set screw, Item 49 bearing, Item 48 convex shaped wheel, Item 46 bushing, Item 50 bushing. Item 30 is the concave shaped rail. Item 103 is the feature of the rail that is the concave shape that is placed along the edge of part.

Figure 19:
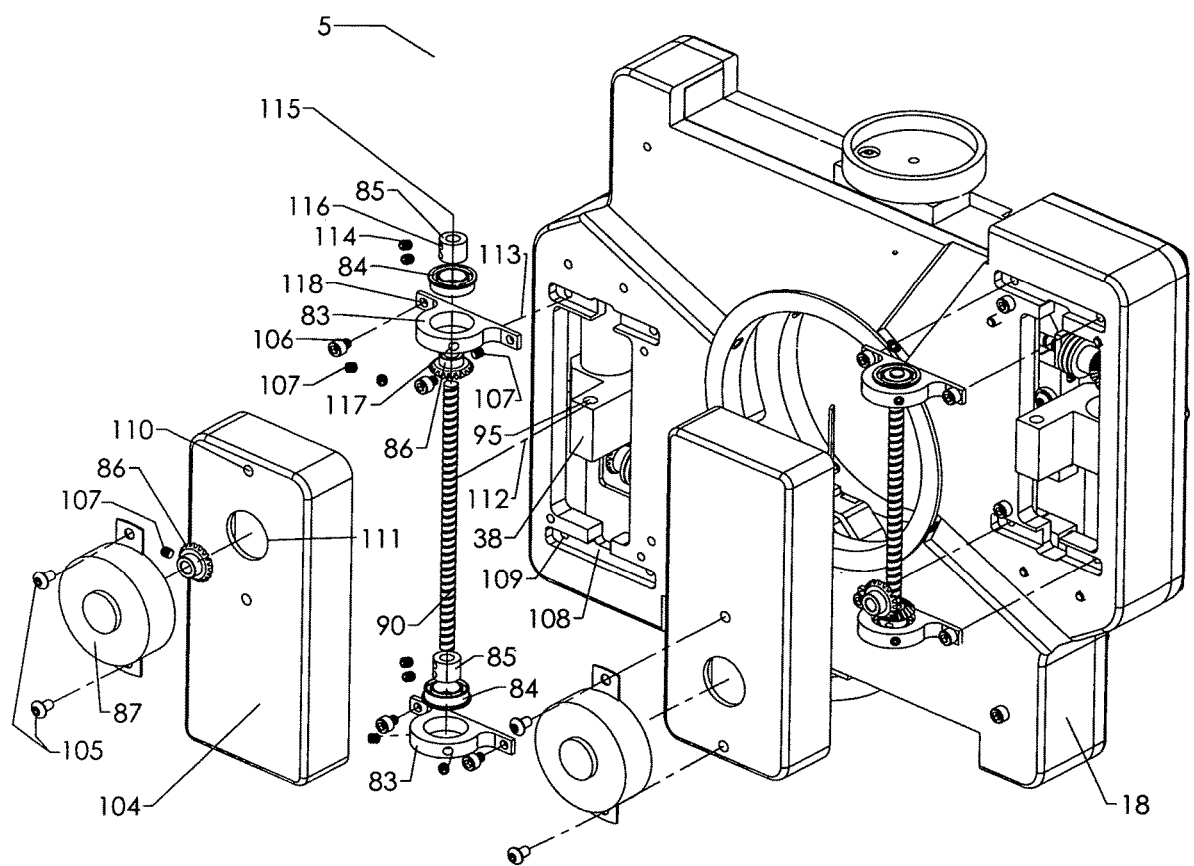
FIG. 19 is an exploded perspective view of the telescope mounting side of the invention.

Page 9, FIG. 19 is an exploded perspective view of the invention Item 5 (telescope mounting side). Only one motor to gear to thread rod and other required parts are described. The other side with the exact same parts is shown but not in detailed exploded view or described. Item 83 is the bearing holder with Item 84 (bearing) and Item 85 (nut) inserted into Item 83.

Set screws (Item 114) thread into hole (Item 116) of Item 85 (nut) that act as a clamp upon the threaded rod Item 90. Set screws (Item 107) thread into hole (Item 117) of bearing holder (Item 83), that clamp onto bearing (Item 84) and hold it in the bearing holder. Item 86 is a miter gear that is inserted onto threaded rod (Item 90) set screw Item 107 clamps gear onto threaded rod. Another miter gear (Item 86) is inserted onto shaft of motor (Item 87), set screw Item 107 clamps gear onto motor shaft. Screws Item 105 attach motor Item 87 to gear cover Item 104 thru threaded holes Item 110. Item 111 is a clearance hole in gear cover Item 104 for clearance of miter gear Item 86. Item 106 are screws that attach the bearing holder Item 83 to the base of invention Item 18. Routing line Item 113 shows where bearing holder Item 83 is placed. Item 108 is a machined pocket in the base of Item 18 with threaded holes Item 109. This pocket Item 108 with threaded holes Item 109 is identical to the pocket where routing line Item 113 is placed. Routing line Item 112 shows where threaded rod Item 90 is placed in hole Item 95 of part Item 38.

Figure 20:
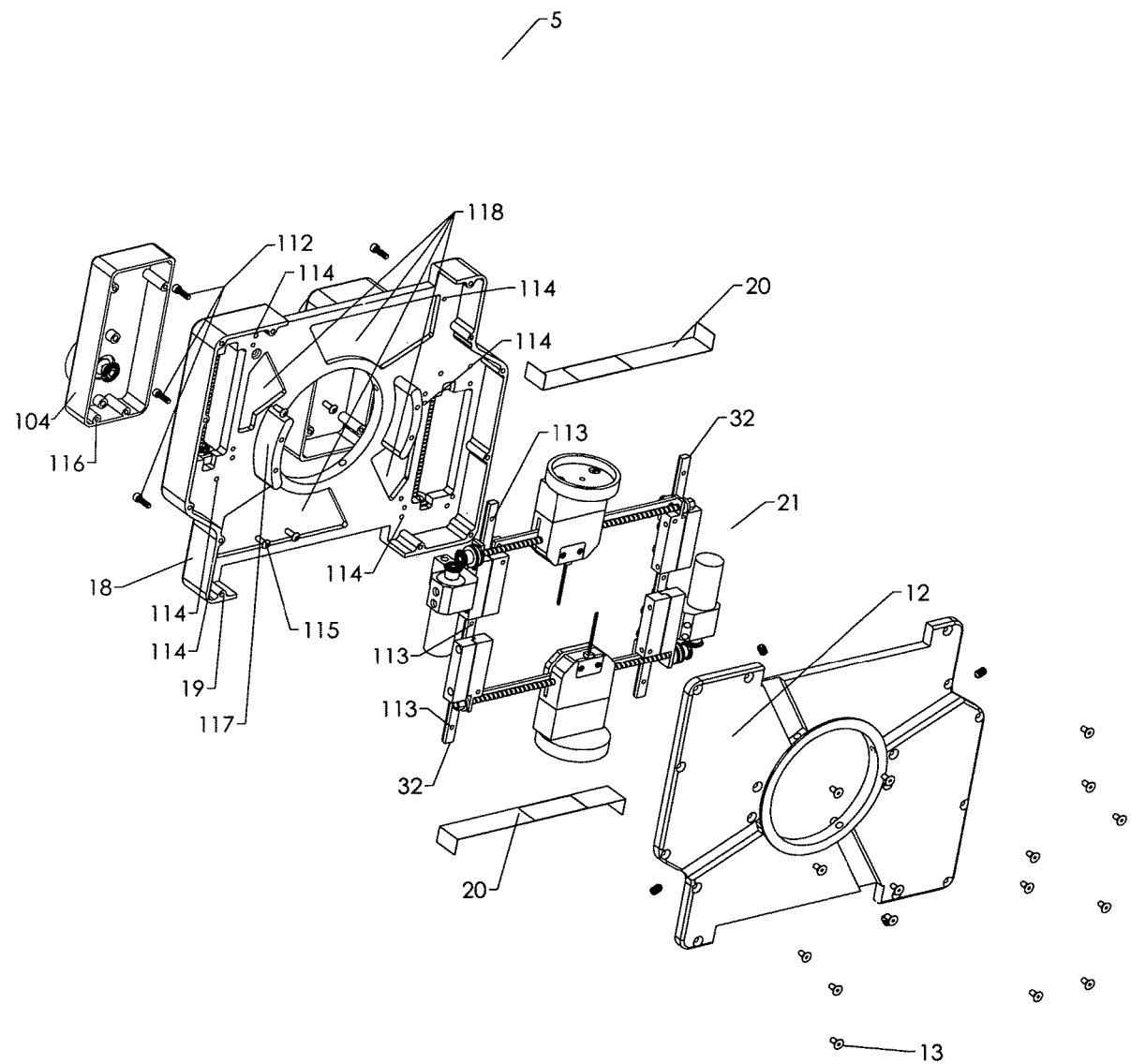
FIG. 20 is an exploded perspective view of the camera mounting side of the invention.

Page 10 FIG. 20 is a exploded perspective view of the invention Item 5. Item 12 is the cover of the invention. Item 13 are counter sink screws that attach the cover Item 5 to the Base Item 18 via the screw holes Item 19 in the base. Item 21 is the dual access port assembly. Item 20 is the stray light blocking material. Item 32 is the rail (with concave edges) for the Y direction movement. Item 113 are threaded screw holes, for attaching the rails (Item 32) to the base (Item 18) via screws Item 112 that pass thru clearance holes Item 114 that are in the base Item 18 of invention. On Item 18 (the Base) Item 117 is a boss that extends from inside of the base. This feature Item 117 has mounting holes for Item 13. The purpose for 117 is to allow more attachment points (threaded screw holes) for the cover Item 12 and add additional rigidity for the overall invention. Item 118 are large pockets that are milled or machined or formed by other manufacturing processes, that lighten the weight of the base (Item 18) yet stiffness and rigidity is maintained in the base Item 18. Item 104 is a cover that screws Item 115 are attach to threaded holes Item 116.

Page 11 FIG. 21 is a partially exploded perspective view of the invention Item 5. Item 12 the cover of invention is separated from the assembly that shows the interior side of Item 12. Item 119 are pockets or cavities that are fabricated into part. This is a light weighting technique which will not harm the stiffness or rigidity of part and or invention.

FIG. 22 is a simple axis schematic that shows the directions of the optical axis relative to the invention. The Z line is the Z axis of the telescope which is the direction that light will flow. The X and Y axis lines are the directions that flow away from the central optical axis of the telescope (Z axis line).

What is claimed:

1. An off axis guider assembly, comprising parts that form a housing, the housing is a fixed body and has a central passageway and has a cavity or chamber, the off axis guider assembly comprising an xy translation system;
    the xy translation system comprises a receptacle (24) for a camera adapter, the camera adapter is attached to a connecting piece (25), wherein the connecting piece is attached to a threaded prism carriage (26) and the prism carriage (26) has rollers that move across a bar (30);
    wherein the xy translation system further comprises a threaded rod (31) that moves the prism carriage (26) and attached to the prism carriage (26) is a prism stem cover (27), a prism stem (28), and a prism (29), wherein the prism (29) is attached to the prism stem (28);
    wherein the xy translation system further comprises a first carriage element (33, 34) and a second carriage element (35, 36) and rails (32); the first and second carriage elements having wheels allowing movement along the rails (32);
    wherein the xy translation system further comprises a motor (37), a gear (39) attached to the motor (37), and engaging a corresponding miter gear (39) attached to the threaded rod (31).

2. The off axis guider assembly of claim 1,
    wherein the chamber comprises two xy translations systems that have attached an optical element.

3. The off axis guider assembly of claim 1 wherein the xy translation system has an attached optical element, wherein the xy translation system has a passageway configured to allow for a portion of the incident light to be diverted at a right angle through the passageway a camera.

4. The off axis guider assembly of claim 1,
wherein the receptacle (24) is configured to attach a mounting adapter (9) for an auto guiding camera.

5. The off axis guider assembly of claim 1 wherein the xy translation system includes at least one gear, at least one bearings, at least one motor, and at least one fastener.

6. The off axis guider assembly of claim 1 is configured to connect to a telescope with at least one adapter (7), the mounting adapter comprises socket set screws (14) as clamps; and
wherein the off axis guider assembly is configured to connect to a camera with a connector (6), the connector being attached to a camera (4) with socket set screws (14).

7. The off axis guider assembly of claim 1, wherein the xy translation system is configured to position the prism to select a guide star, such that the prism is not an optical hindrance to an attached main camera, in which the main camera is attached to the off axis guider housing.

8. The off axis guider assembly of claim 1, wherein the stem is a hollow tubular appendage replaceable within the xy translation system.

9. The off axis guider assembly of claim 1, further comprising a light baffling to block stray or external light.

10. The off axis guider assembly of claim 1, wherein the chamber of the off axis guider assembly comprises two xy translation systems, whereby each of the xy translation systems can be positioned, irrespective of each other.

11. The off axis guider assembly of claim 1, further comprising a second motor (87) attached to a miter gear (86) and engages miter gear (86) and is attached to a threaded rod (90) and the threaded rod (90) engages motor bracket (38).

* * * * *